UNITED STATES PATENT OFFICE.

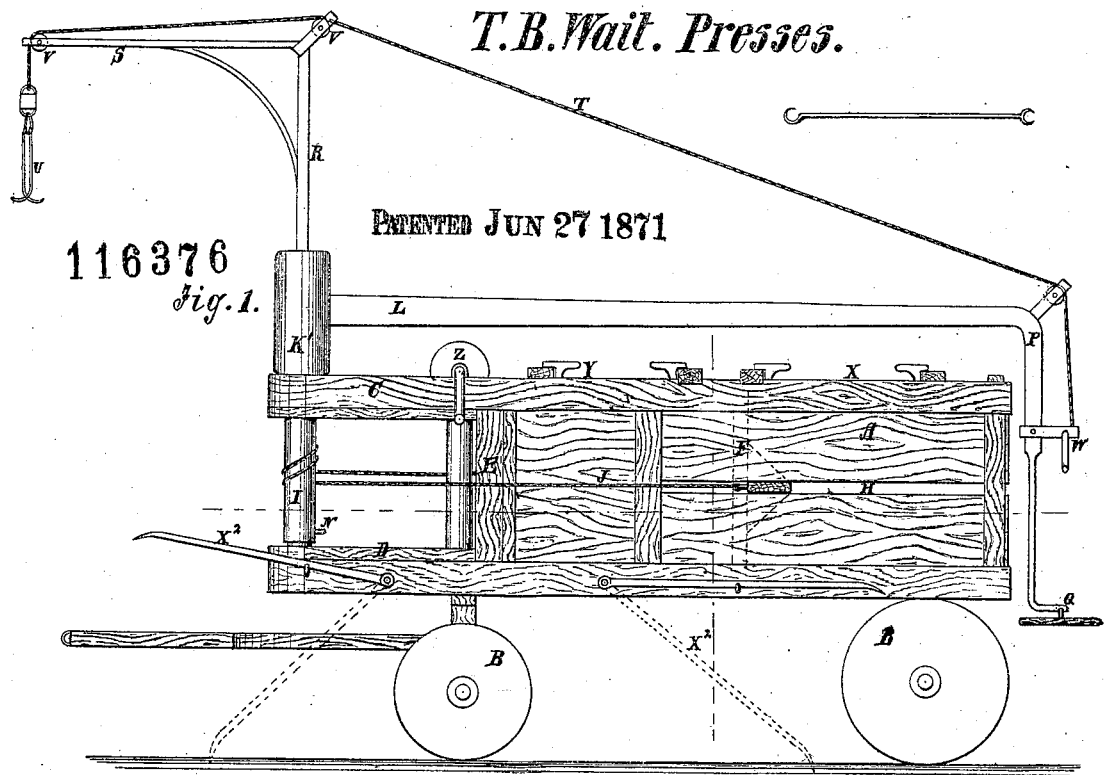
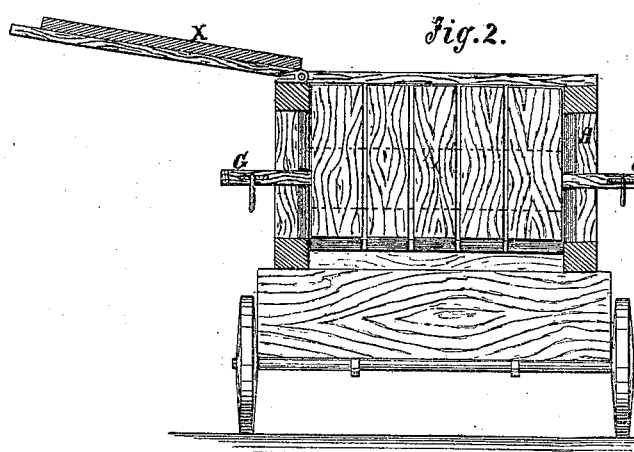
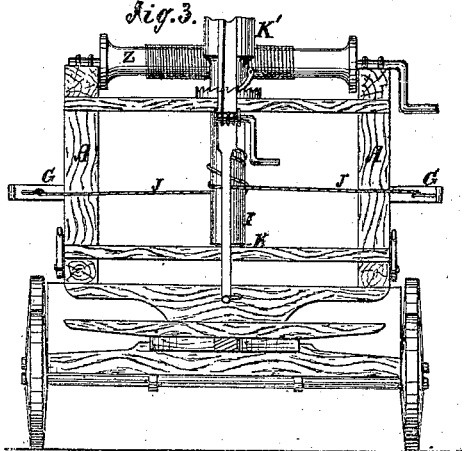
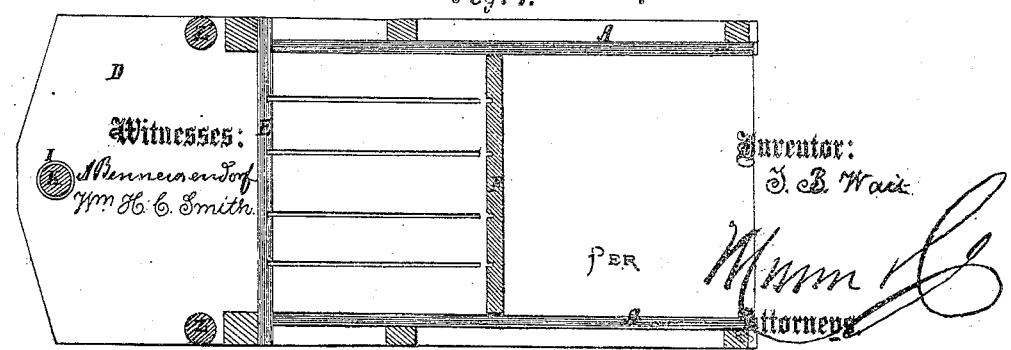

THOMAS B. WAIT, OF ZENA, OREGON.

IMPROVEMENT IN PORTABLE POWER-PRESSES.

Specification forming part of Letters Patent No. 116,376, dated June 27, 1871.

*To all whom it may concern:*

Be it known that I, THOMAS B. WAIT, of Zena, in the county of Polk and State of Oregon, have invented a new and Improved Portable Power-Press; and I do hereby declare that the following is a full, clear, and exact description thereof, which will enable others skilled in the art to make and use the same, reference being had to the accompanying drawing forming part of this specification.

My invention consists in the improvement hereinafter fully described in connection with other parts of a power-press, and subsequently pointed out in the claim.

Figure 1 is a side elevation of my improved machine. Fig. 2 is a transverse section taken on the line $x\ x$ of Fig. 1. Fig. 3 is an end elevation, and Fig. 4 is a horizontal section taken on the line $y\ y$ of Fig. 1.

Similar letters of reference indicate corresponding parts.

A represents a long horizontal rectangular case, mounted on a truck, B, of any kind, and having the timbers C and bottom D projecting at the front considerably beyond the end wall or breast E, against which the material is pressed by the follower F, which has a strong bar, G, projecting at each end through a slot, H, in the side of the case for the attachment of the ropes or chains J, which are attached to the vertical windlass mounted in the front extension of the case, and consisting of the sleeve I, vertical shaft K, and the sweep L, the said sleeve being held by a pin, N, to turn with the shaft to wind up the ropes; and it is let free for unwinding the ropes to admit of moving the follower back by pulling out the pin; and the sweep is attached to the extension K' of the shaft above the case to work over the top of it, and is bent downward at P, where it will swing beyond the rear end of the case for the attachment of the hitching-gear Q for the animals. R is a crane mounted in the top of the extension K' of the shaft, and so arranged that the horizontal arm S projects from the shaft in the opposite direction to that of the sweep. T is a hoisting-rope, with hooks U or other attaching apparatus suspended from the crane on suitable guide or friction-rollers, and extending to a hand-cranked winding-drum, W, mounted on the sweep near the hitching-place for winding up the rope to raise the bale out of the press after it has been made. The case has a door, X, for opening to put in the hay or other matter to be pressed, and another one, Y, to open for removing the bale. Z is a twine-spool mounted on the top near the front, for holding the twine for tying the bale. Z' represents vertical guide-rollers placed at the front corners of the case to prevent the ropes from rubbing the corners of the case. $X^2$ represents braces pivoted to the truck-frame so as to be let down at one end upon the ground to brace the machine while working it.

Having thus described my invention, I claim as new and desire to secure by Letters Patent—

The sweep L P Q, vertical shaft K' having pin N, and the crane R S, all combined as and for the purpose specified.

The above specification of my invention signed by me this 27th day of December, 1870.

THOMAS B. WAIT.

Witnesses:
 G. T. WALLER,
 H. M. BRUNK.